United States Patent
Loomba et al.

(10) Patent No.: US 10,666,570 B2
(45) Date of Patent: May 26, 2020

(54) COMPUTING INFRASTRUCTURE RESOURCE-WORKLOAD MANAGEMENT METHODS AND APPARATUSES

(71) Applicant: Intel Corporation, Santa Clara, CA (US)

(72) Inventors: Radhika Loomba, County Kildare (IL); Thijs Metsch, Bruehl (DE); Grigorios Katsaros, London (GB); Joseph Butler, County Meath (IL); Kevin Mullery, County Galway (IL)

(73) Assignee: Intel Corporation, Santa Clara, CA (US)

( * ) Notice: Subject to any disclaimer, the term of this patent is extended or adjusted under 35 U.S.C. 154(b) by 657 days.

(21) Appl. No.: 15/361,905

(22) Filed: Nov. 28, 2016

(65) Prior Publication Data

US 2018/0152390 A1    May 31, 2018

(51) Int. Cl.
*H04L 29/08*    (2006.01)
*H04L 12/911*   (2013.01)

(52) U.S. Cl.
CPC .......... *H04L 47/70* (2013.01); *H04L 67/1031* (2013.01)

(58) Field of Classification Search
CPC .... G06Q 10/10; G06Q 10/0631; H04L 47/70; H04L 67/1002; H04L 67/1031
See application file for complete search history.

(56) References Cited

U.S. PATENT DOCUMENTS

| | | | | |
|---|---|---|---|---|
| 6,438,573 B1* | 8/2002 | Nilsen | ....................... | G06F 8/10 |
| | | | | 718/100 |
| 7,225,118 B2* | 5/2007 | Wang | ..................... | G06Q 10/10 |
| | | | | 703/22 |
| 9,846,600 B1* | 12/2017 | Williams | .............. | G06F 9/5038 |
| 10,250,673 B1* | 4/2019 | Brooker | ................. | H04L 67/10 |

(Continued)

OTHER PUBLICATIONS

Xu et al., "Multi-objective Virtual Machine Placement in Virtualized Data Center Environments," 2010 IEEE/ACM International Conference on Green Computing and Communications & 2010 IEEE/ACM International Conference on Cyber, Physical and Social Computing, pp. 179-188.

(Continued)

*Primary Examiner* — Oanh Duong
(74) *Attorney, Agent, or Firm* — Schwabe, Williamson & Wyatt, P.C.

(57) ABSTRACT

Apparatuses and methods associated with management of computing infrastructure resources and workloads are disclosed herein. In embodiments, an apparatus may comprise a resource-workload manager having: a placement solution generator to generate a plurality of potential resource placement solutions for allocation of various resources of the computing infrastructure to various workloads; one or more utility function calculators to calculate one or more values for one or more provider-centric attributes, and one or more values for one or more customer-centric attributes, for the plurality of potential solutions; an analyzer to analyze the attributes and select one of the potential resource placement solutions; and a resource allocator to allocate the resources, based at least in part on the selected resource placement solution. Other embodiments may be described and/or claimed.

24 Claims, 7 Drawing Sheets

(56) References Cited

U.S. PATENT DOCUMENTS

| | | | | |
|---|---|---|---|---|
| 2008/0022282 | A1* | 1/2008 | Cherkasova | G06F 9/505 718/102 |
| 2010/0228861 | A1* | 9/2010 | Arsovski | G06F 9/5027 709/226 |
| 2011/0307901 | A1* | 12/2011 | Blanding | G06F 9/5061 718/104 |
| 2012/0036249 | A1* | 2/2012 | Chandrasekaran | G06F 9/5088 709/224 |
| 2012/0159367 | A1* | 6/2012 | Calcaterra | G06F 9/5011 715/771 |
| 2012/0210356 | A1* | 8/2012 | Kiok | H04N 21/23109 725/39 |
| 2014/0012603 | A1* | 1/2014 | Scanlon | G06Q 10/0631 705/4 |
| 2015/0006734 | A1* | 1/2015 | Parikh | H04L 47/70 709/226 |
| 2016/0117241 | A1* | 4/2016 | Shah | G06F 12/0871 711/119 |
| 2016/0142338 | A1* | 5/2016 | Steinder | H04L 41/0813 709/226 |
| 2017/0063973 | A1* | 3/2017 | Chawla | H04L 41/0893 |
| 2017/0149880 | A1* | 5/2017 | Lochhead | G06F 9/00 |
| 2017/0149931 | A1* | 5/2017 | Lochhead | H04L 47/70 |
| 2018/0074724 | A1* | 3/2018 | Tremblay | G06F 3/0611 |
| 2018/0081726 | A1* | 3/2018 | Ginis | G06F 9/5005 |

OTHER PUBLICATIONS

Jin et al., "Efficient VM Placement with Multiple Deterministic and Stochastic Resources in Data Centers," Globecom 2012—Next Generation Networking and Internet Symposium, pp. 2505-2510.

Li et al., A Fair Comparison of VM Placement Heuristics and a More Effective Solution, 2014 13th International Symposium on Parallel and Distributed Computing, pp. 35-42.

Tumanov et al., "Tetrisched: Space-Time Scheduling for Heterogeneous Datacenters," Parallel Data Laboratory, Carnegie Mellon University, Dec. 2013, Pittsburgh, PA, 27 pages.

Palomar et al., "A Tutorial on Decomposition Methods for Network Utility Maximization," IEEE Journal on Selected Areas in Communications, vol. 24, No. 8, Aug. 2006, pp. 1439-1451.

Wilkes, John, "Utility functions, prices, and negotiation," LABS HP, Hewlett-Packard Development Company, L.P., Jul. 6, 2008, 21 pages.

Macias et al., "Using Resource-level Information into Nonadditive Negotiation Models for Cloud Market Environments," 2010 IEEE/IFIP Network Operations and Management Symposium—NOMS 2010, pp. 325-332.

Edmonds, Jack, "Paths, Trees and Flowers," in Classic Papers in Combinatorics, Springer, 2009, 19 pages.

Lo et al., "Heracles: Improving Resource Efficiency at Scale," 2015 In Proceedings of the 42nd ACM Annual International Symposium on Computer Architecture (ISCA), pp. 1-13.

* cited by examiner

COMPUTING INFRASTRUCTURE RESOURCE-WORKLOAD MANAGEMENT METHODS AND APPARATUSES

TECHNICAL FIELD

The present disclosure relates to the field of computing. More particularly, the present disclosure relates to computing infrastructure resource and workload management methods and apparatuses.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

By leveraging cloud computing service-models, service providers deploy and maintain multiple workloads across globally distributed data centers. Current approaches to workload scheduling and placement sacrifice either precision or scalability when presented with heterogeneous platform configurations, which limits the value of specialization in the infrastructure. In a heterogeneous environment, the challenge for the service provider is to enable the infrastructure resource manager (also referred to as the "orchestrator") to properly decide amongst multiple placement options, the best-match in terms of compute, network and storage resources for instantiating the different components of a workload whilst meeting the SLA (Service Level Agreement). Another key challenge is the trade-off between the business objectives of the service customers who seeks best service performance vs the service provider who seeks to optimize the data center for total cost of ownership (TCO).

However, currently, there is no unified methodology for the calculation of the preference of a placement/rebalancing solution and its comparison from another. Thus, the technical problems that need to be solved to improve the operation of cloud computing infrastructure, in particular, the management of cloud computing infrastructure resources, are:

a) how to effectively quantify the parameters affecting placements/rebalancing of the cloud computing infrastructure resources;

b) how an orchestrator could efficiently compare and contrast potential placement/rebalancing solution; and c) how the orchestrator can automatically and at scale reason and execute placement decisions to optimally deliver value from differentiating platform features.

BRIEF DESCRIPTION OF THE DRAWINGS

Embodiments of the block structure and robot cooperation methods and apparatuses of the present disclosure will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
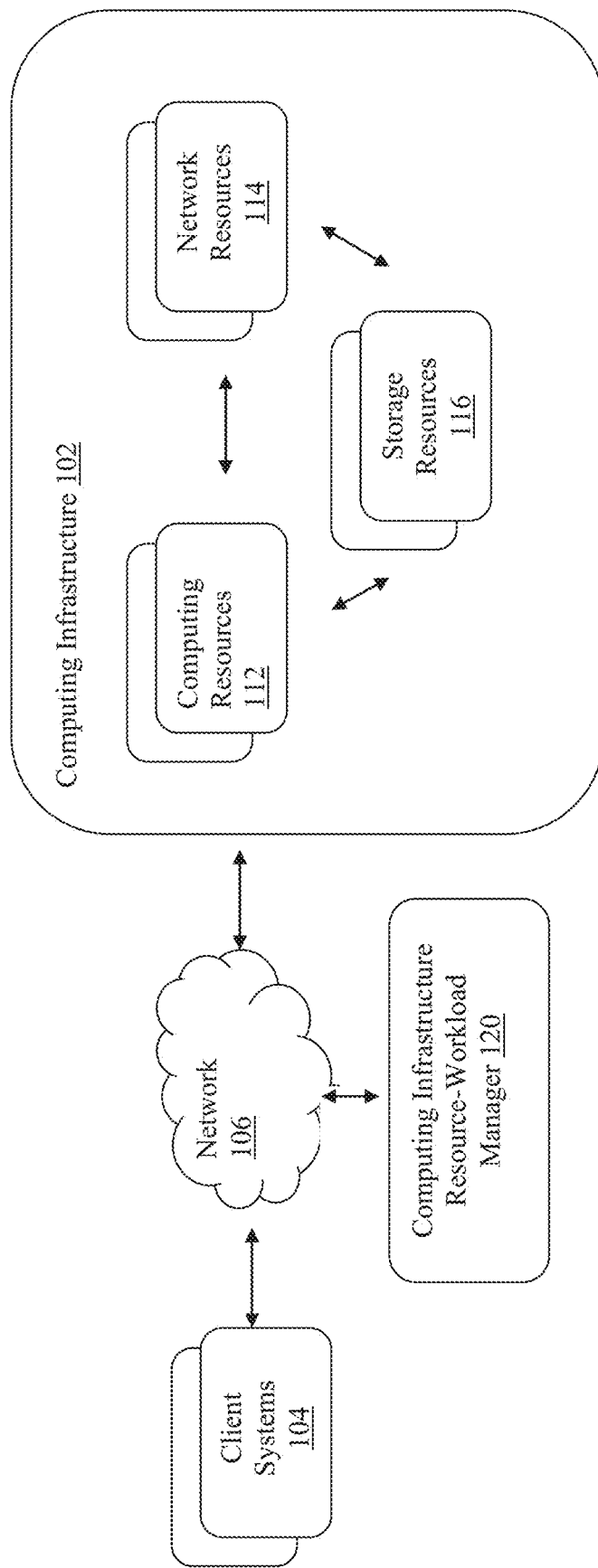
FIG. 1 illustrates an overview of a computing infrastructure with resources to provide computing services to various client systems, having the computing infrastructure resource-workload management technology of the present disclosure, according to various embodiments.

The present disclosure may solve the above technical problems improve the operation of computing infrastructure, such as cloud computing infrastructure, in particular, the management of the computing infrastructure's resources and workload assignment. The present disclosure may allow the computing service provider as well as the customer, the ability to capture the benefits and shortcomings of each placement/rebalancing solution on their own choice of parameters.

More specifically, embodiments of the present disclosure may use utility theory to quantify a potential placement/rebalancing solution based on a k-dimensional parameter space to indicate the preference of one over the other. The present disclosure may formalize these various influencing parameters as 'attributes' and provide a unified perspective, considering both the context of the service provider and the customer. Thus, the attributes of the present disclosure may include definitions and mathematical formulizations for revenue and expenditure (for the service provider) while also incorporating the attributes that are derived from the SLA and take customer experience (throughput and latency) into consideration.

Embodiments of the present disclosure may then evaluate the preferences and priorities of the attribute values by using the multi-attribute utility theory (MAUT). Using the individual sub-utility functions for each attribute, embodiments of the present disclosure may formulate two multiplicative utility functions, one for the service provider and one for the customer, that examine the attributes as non-independent entities.

Using this methodology, an orchestrator of a computing infrastructure may use these two sets of utility values, and by comparison decide for the best placement or rebalancing solution considering the business model and goals. Because expenditure can incorporate all cost elements, the value proposition of differentiated or heterogeneous infrastructures can be exposed precisely.

In embodiments, an apparatus for managing resources and their assigned workloads of a computing infrastructure, may comprise a resource-workload manager having: a placement solution generator to receive resource data and workload data for the computing infrastructure, and generate a plurality of potential resource placement solutions for allocation of the various resources of the computing infrastructure to various components of the various workloads; one or more utility function calculators communicatively coupled with the placement solution generator to calculate one or more values for one or more provider-centric attributes, and one or more values for one or more customer-centric attributes, for the plurality of potential resource placement solutions; an analyzer communicatively coupled to the one or more utility function calculators to analyze the attributes and select one of the potential resource placement solutions; and a resource allocator communicatively coupled to analyzer to allocate the resources of the computing infrastructure, based at least in part on the selected resource placement solution.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Referring now FIG. 1, wherein a block diagram illustrating an overview of a computing infrastructure with resources to provide computing services to various client systems, having the computing infrastructure resource and workload management technology of the present disclosure, according to various embodiments, is illustrated. As shown, computing infrastructure 102 may include a number of resources, such as computing resources 112, network resources 114, and storage resources 116, that may be allocated to provide computing services to various client systems 104. Client systems 104 may be communicatively coupled to computing infrastructure 102 via network 106. Resources of computing infrastructure 102 may be allocated to provide computing services to various client systems 104 under the control of computing infrastructure resource-workload manager 120, incorporated with the management technology of the present disclosure, to be described more fully later. In embodiments, computing infrastructure 102 may be a cloud computing infrastructure with resources to provide cloud computing services to client systems 104.

Compute resources 112, network resources 114, and storage resources 116 of computing infrastructure 102 may be homogeneous, of the same types, or heterogeneous, of different types. Compute resources 112, network resources 114, and storage resources 116 may be distributed/located in a plurality of different physical locations (data centers). Some resources may be located in the same physical location (data center). Computing resources 112 may include any number of computing devices of any type, virtual or real, such as, servers, desktops, laptops, set-top boxes, tablets, mobile devices, wearable devices, and virtual machines, that can be allocated to perform computing services for client systems 104. Network resources 114 of computing infrastructure 102 may include any number of networking resources of any type, virtual or real, to selectively couple computing resources 112, network resources 114 and storage resources 116, to one another, such as gateway, switches, routers, access points, base stations, and so forth. Storage resources 116 of computing infrastructure 102 may include any number of storage resources of any type, such as, volatile or non-volatile memory, solid state, magnetic or optical mass storages, that can be allocated to store working or persistent data of client systems 104.

Client systems 104 and network 106 may be any number of such elements known in the art. For examples, client systems 104 may be desktops, laptops, set-top boxes, game consoles, tablets, mobile devices, or wearable devices. Network 106 may be any number of wired or wireless networks, including private and/or public networks, such as the Internet. An example of wired networks may include, but are not limited to local Ethernet networks or wide area optical networks. Examples of wireless networks may include, but are not limited to, cellular, WiFi, Bluetooth®, and so forth.

Computing infrastructure resource-workload manager (or orchestrator) 120 may be implemented in hardware or software, or both. A hardware implementation may include various ASIC or FPGA programmed with the operation logic. A software implementation may include various modules/routines of instructions executable by computer processors. A hardware/software implementation may include elements of both types.

Current commercial and open-source orchestration solutions typically schedule pessimistically to avoid conflicts, and workload pattern induced performance issues. Various innovations in research have responded to aspects of this problem. Researchers have explored genetic algorithms, approximation algorithms, stochastic bin-packing methods, and multiple heuristics for efficient placement. However, the known approaches typically limit the number of attributes under investigation and do not study the trade-off between the benefits gained by the service provider vs the customer for a placement decision.

As will be described more fully below, the management or orchestration technology of the present disclosure may define these benefits as utility functions for improving overall infrastructure throughput. The management or orchestration technology of the present disclosure may implement utility functions for a wide array of attributes (including provider-centric and customer-centric attributes) to formally quantify a potential placement/rebalancing solution. In embodiments, non-additive utility functions may be employed, which give the advantage of considering the trade-offs between the attributes instead of considering them as independent attributes. Further, in embodiments, these functions may be implemented for the placement/rebalancing phase of the machines instead of the negotiation phase of the SLA for a better understanding of the way a placement affects the service provider and the customer.

Figure 2:
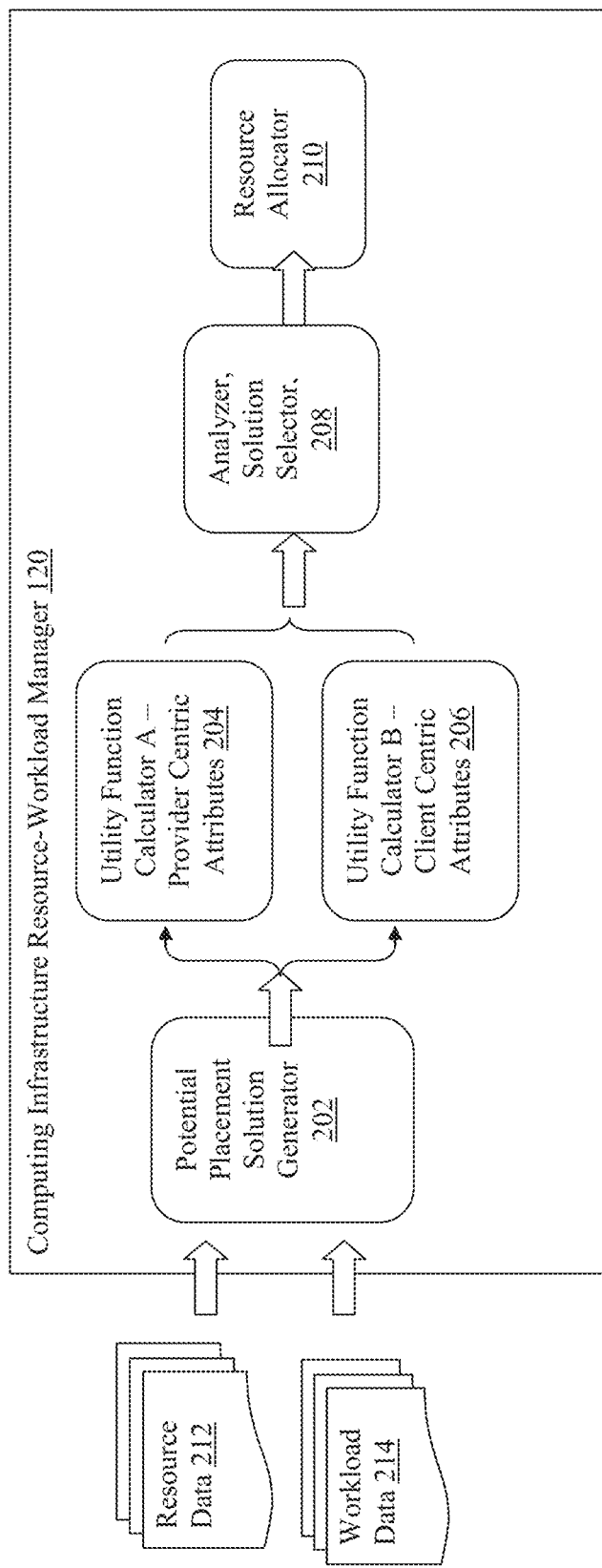
FIG. 2 illustrates an example computing infrastructure resource-workload manager, according to various embodiments.

Referring now to FIG. 2, wherein an example computing infrastructure resource-workload manager, according to various embodiments, is illustrated. As shown, in embodiments, computing infrastructure resource-workload manager (or orchestrator) 120 may include potential placement solution generator (or simply, placement solution generator) 202, one or more utility function calculators 204-206, an analyzer 208 and a resource allocator 210, communicatively coupled to each other as shown.

Potential placement solution generator 202 may be configured to receive resource data 212 and workload data 214, and in response, generate potential placement solutions, i.e., placements or allocations of various resources for the various workloads. In embodiments, resource data 212 may set forth the resources of the computing infrastructure (i.e., resources-services landscape), and workload data 214 (service requests) may set forth the computing services to be provided to various customer client systems (optionally, including service level requirements). In embodiments, both the resources—services landscape and the service requests can be described as a graph. Nodes may be used to detail the entities (compute, network and storage physical and virtual elements) and edges may be used to denote their relationships. For the service requests, the graph may indicate a possible topology, the resources and services landscape may be an actual topology—which can even be enhanced with indicators from telemetry (such as Utilisation and Saturation values indicating hot and cold spots in the landscape).

In embodiments, one or more utility function calculators 204-206 may include utility function calculator A 204 and utility function calculator B 206. Utility function calculator A 204 may be configured to calculate values of various provider-centric attributes for the various potential placement solutions, and utility function calculator B 206 may be configured to calculate values of various customer-centric attributes for the various potential placement solutions.

In embodiments, analyzer 208 may be configured to process and compare the values of the provider-centric attributes and values of the customer-centric attributes, and select the best or optimal placement solution. In embodiments, analyzer 208 may output the selected placement solution for resource allocator 210. In embodiments, resource allocator 210 may be configured to allocate the various resources of the computing infrastructure to provide computing services to the various client systems, in accordance with at least the selected placement solution.

Figure 3:
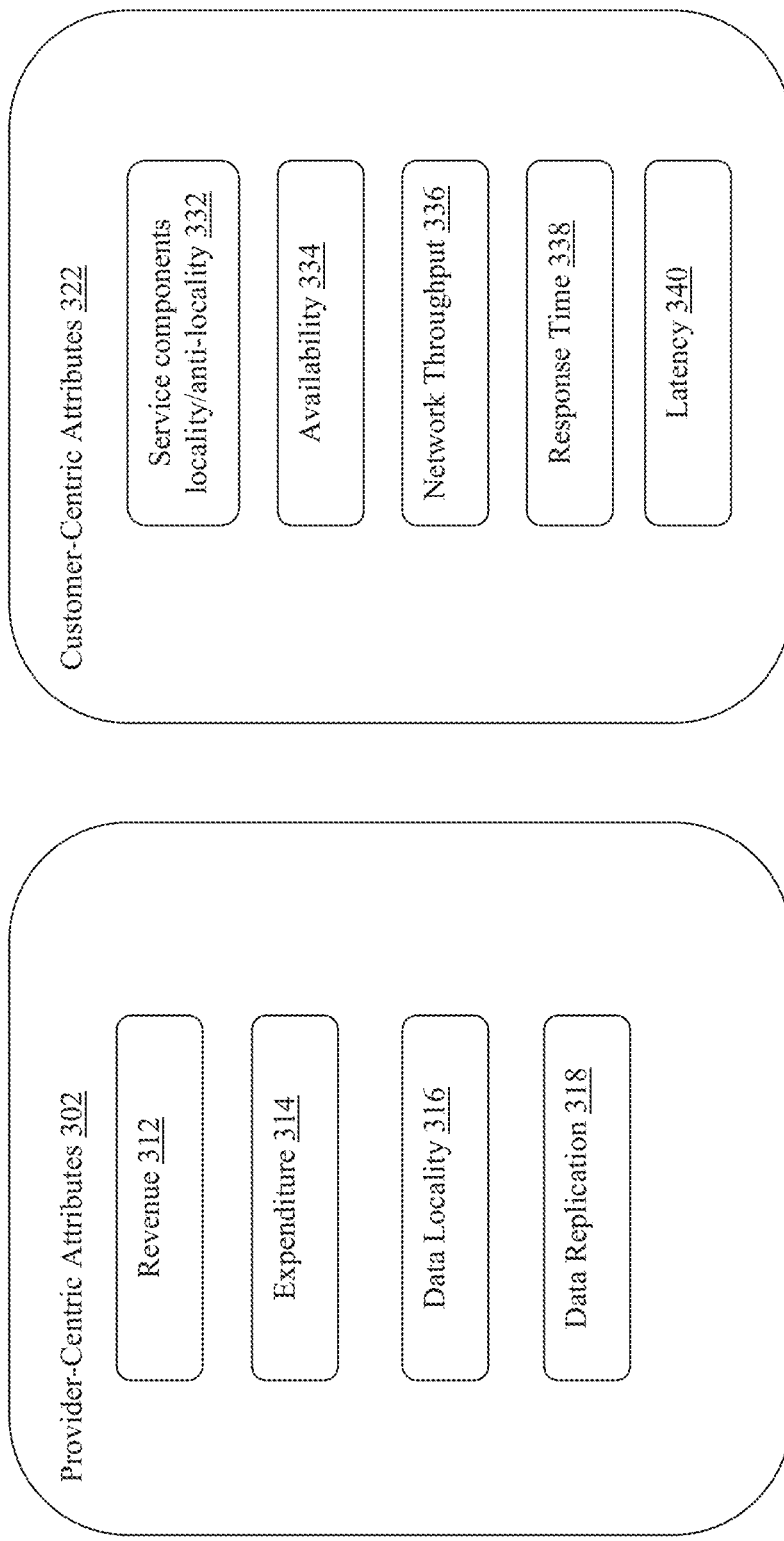
FIG. 3 illustrates example attributes for managing computing infrastructure resources and workloads, according to various embodiments.

Referring now to FIG. 3, wherein various example attributes for managing computing infrastructure resources, according to various embodiments, is illustrated. As shown, in embodiments, provider-centric attributes 302 may include revenue attribute 312, expenditure attribute 314, data locality attribute 316 and data replication attribute 318. For customer-centric attributes 322, they may include service components locality/anti-locality attribute 332, availability attribute 334, network throughput attribute 336, response time attribute 338 and latency attribute 340.

In embodiments, revenue attribute 312 may detail an amount of credit ($) the provider would gain by hosting a service (with a particular placement solution). For example, revenue attribute 312 may be calculated based on type & amount of nodes in the graph of workload data 214 detailing the service request. In embodiments, expenditure attribute 314 may detail the total cost of ownership (TCO) in credits ($) of the resources (e.g. CPUs, disks) in the resource-service landscape which are (possibly) needed to handle the service request (with a particular placement solution). Together, revenue attribute 312 and expenditure attribute 314 may define a profit attribute (for a particular placement solution): $\mathcal{U}(P)$.

In embodiments, data locality attribute 316 may detail the distance or access frequency between the infrastructure's compute resources and (possibly pre-existing) storage entities (for a particular placement solution). In embodiments, values of data locality attribute 316 may be calculated by looking at distances between compute and storage nodes in the graph of resource data 212. This attribute assumes moving data around incurs a cost. The attribute may be named: $\mathcal{U}(\mathcal{D})$. In embodiments, data replication attribute 318 may detail the number of possible data/storage replicas the infrastructure has to deal with for fault-tolerance/high availability/performance issues (for a particular placement solution). Values of data replication attribute 318 may be calculated based on the number of duplicate nodes in the resource-landscape graph of resource data 212. The attribute may be named: $\mathcal{U}(R)$.

In embodiments, service components locality/anti-locality attribute 332 may detail the requirements of the service to be hosted in one or in separated locations (geo, rack, server etc.) (for a particular service request/workload). The requirements may be set forth e.g., in the service request graph of workload data 214. In embodiments, values of service components locality/anti-locality attribute 332 may be calculated based on the distance between nodes in the graph. The attribute may be named: $\mathcal{U}(L)$. In embodiments, availability attribute 334 may detail the desired availability of the service (of a particular service request/workload). In embodiments, it may be defined as gold, silver, bronze level offerings, and hence available as attribute in the service request graph of workload data 214. In embodiments, values of availability attribute 334 may be calculated based on replicated nodes in the graph. The attribute may be named: $\mathcal{U}(A)$.

In embodiments, network throughput attribute 336 may detail the desired minimum network throughput the service needs (for a particular service request/workload). The minimum network throughput the service needs may be located in the service request graph of workload 214. In embodiments, network throughput attribute 336 may be calculated based on the edge between two particular nodes. The attribute may be named: $\mathcal{U}(T)$. In embodiments, response time attribute 338 may detail the time at which a task is to be completed—can include notions of runtime (for a particular service request/workload). The time at which a task is to be completed may be located in the service request graph of workload data 214. In embodiments, response time attribute 338 may be calculated based on the number of entities minimally involved in ensuring the service availability. The attribute may be named: $\mathcal{U}(Rt)$.

In embodiments, latency attribute 340 may detail the maximum desired latency between two service components (for a particular service request/workload). The maximum desired latency between two service components may be located in the service request graph of workload data 214. In embodiments, latency attribute 340 may be calculated based on the nodes and edge attributes (possible bandwidth current usage) between nodes in the landscape graph of resource data 212. The attribute may be named: $\mathcal{U}(Lt)$.

In embodiments, all attributes represent the context of the current running service and resources of the landscape. This includes notions of which physical resources are available and which service components are already running.

Embodiments of these attributes will be further described below, after the description of an example process for managing computing infrastructure resources and workloads.

Figure 4:
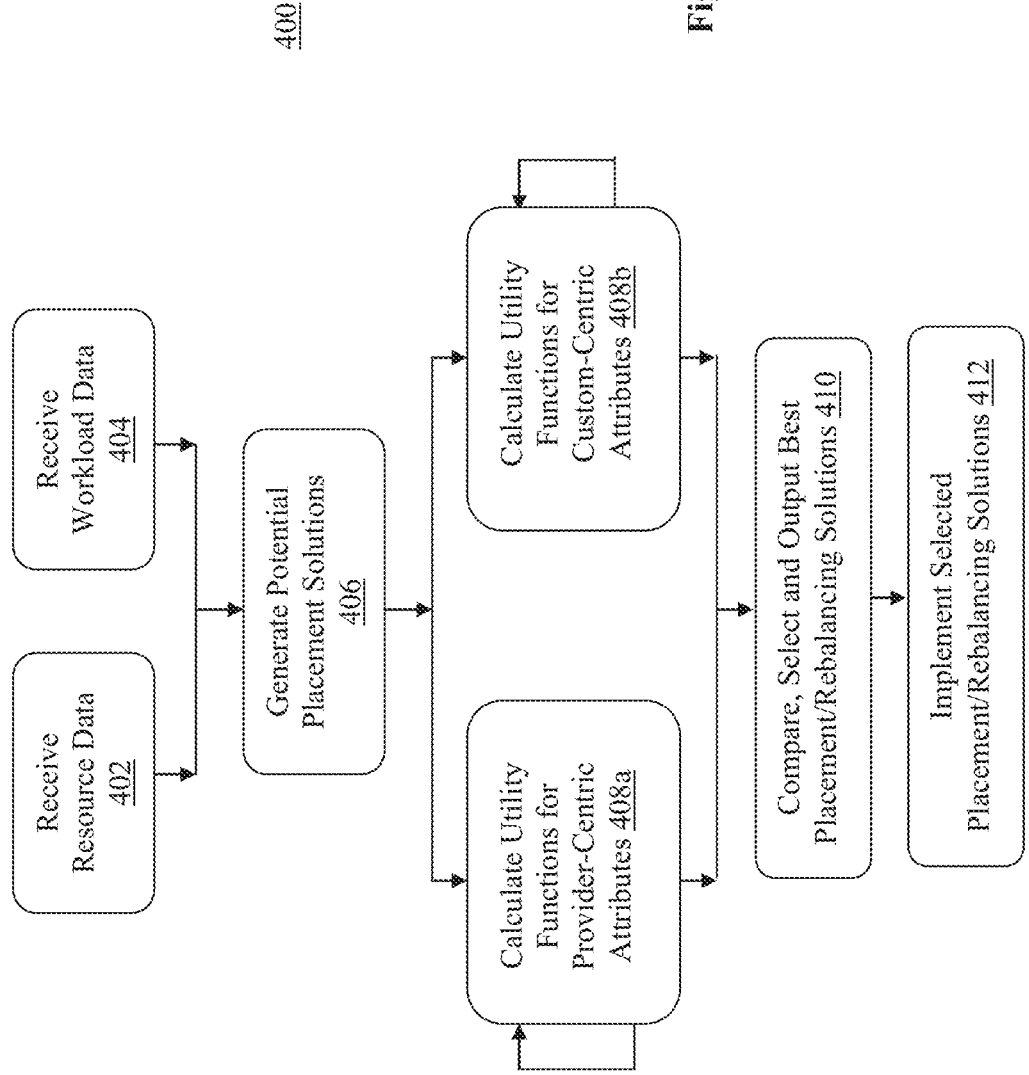
FIG. 4 illustrates an example process for managing computing infrastructure resources and workloads, according to various embodiments.

Referring now to FIG. 4, wherein an example process for managing computing infrastructure resources, according to various embodiments, is illustrated. As shown, process 400 for managing computing infrastructure resources may include operations performed at blocks 402-412. In embodiments, the operations may be performed by potential placement solution generator 202, utility function calculators 204-206, analyzer 208 and resource allocator 210, of computing infrastructure resource-workload manager (or orchestrator) 120.

Process 400 may begin at blocks 402 and 404. At blocks 402 and 404, resource data denoting resources of the computing infrastructure, and workload data denoting service requests of the client systems for computing services may be received.

Next, at block 406, potential placement solutions of the resources of the computing infrastructure for the various services requests of the workload may be generated.

At blocks 408a and 408b, the values for the provider-centric attributes and the values for the customer-centric attributes may be computed for each of the placement solutions. The operations at blocks 408a and 408b may be repeated as many times as necessary to have the values of the provider-centric and customer-centric attributes computed for each of the placement solutions.

In embodiments, the calculation of the utility functions for one solution based on these attributes, may be represented by $\mathcal{A} = \mathcal{A}_1 \cup \mathcal{A}_2 = \{\alpha_1 \ldots \alpha_i \ldots \alpha_k\}$, with $k \geq 2$, associated with our placement/rebalancing decision problem. Here subset $\mathcal{A}_1$ may contain all provider-centric attributes and subset $\mathcal{A}_2$ may contain all customer-centric attributes. For each attribute, the service provider/customer may also provide a weight or a priority value to indicate the importance of the attribute ($\alpha_k$) along with additive weight that stores dependence on other attributes ($\beta_k$). Additionally, the preferences for these attributes are not hard constraints, and they evolve with each request and incorporate the trade-offs or relational operations between the attributes.

In embodiments, once the sub-utility values for the attributes are available, a decomposed assessment may be used to calculate the two utilities of a placement/rebalancing solution, namely $\mathcal{U}_s$ which stands for the service provider-centric utility function and $\mathcal{U}_e$ which stands for the customer-centric utility function. These in-turn may be calculated based on a multiplicative function (as attributes may be considered inter-independent) on the k conditional utilities for each attribute.

For the provider utility, $\mathcal{U}_s$ may be defined as:

$$\mathcal{U}_s = (\alpha_1 * \mathcal{U}(P) + \beta_1) * (\alpha_2 * \mathcal{U}(\mathcal{D}) + \beta_2) * (\alpha_3 * \mathcal{U}(R) + \beta_3) \quad (1)$$

And for the customer utility, $\mathcal{U}_e$ may be defined as:

$$\mathcal{U}_e = (\alpha_4 * \mathcal{U}(L) + \beta_4) * (\alpha_5 * \mathcal{U}(A) + \beta_5) * (\alpha_6 * \mathcal{U}(T) + \beta_6) * (\alpha_7 * \mathcal{U}(Rt) + \beta_7) * (\alpha_8 * \mathcal{U}(Lt) + \beta_8) \quad (2)$$

Figure 7:
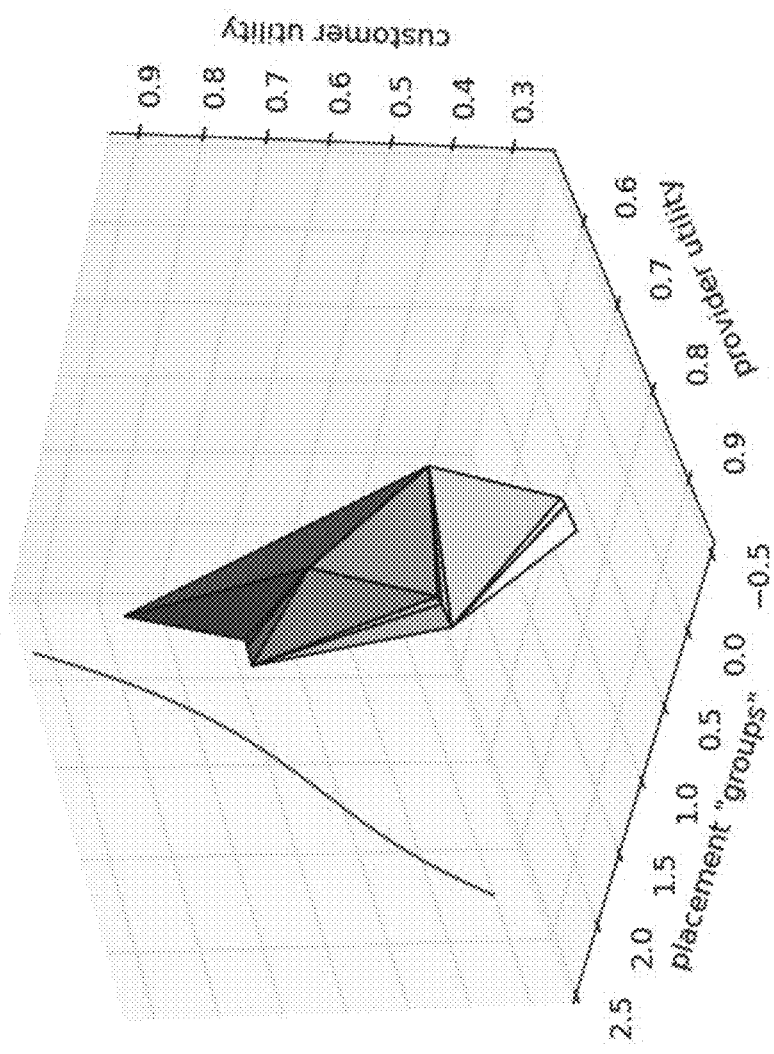
FIG. 7 illustrates an example output of the computing infrastructure resource-workload manager, according to various embodiments.

Thus, the methodology efficiently captures and implements the preferences of the service provider as well as the customer as part of the orchestrator module. The formal representation and calculation of the impact of deployment for the service provider and the customer can effectively contribute towards efficient placement/rebalancing solution decision making. For example, for a set of service placement options the customer and utility can be mapped on a plane as detailed in the sample output shown in FIG. 7. This plane may be computed by the computing infrastructure resource-workload manager (orchestrator).

Still referring to FIG. 4, at block 410, the computed values of the provider-centric and customer-centric attributes computed for each of the placement solutions may be analyzed/compared, and a best/optimal placement solution may be selected based at least in part on the values of the provider-centric and customer-centric attributes of the various placement solutions. In embodiments, on selection, the selected placement solution may be outputted.

In embodiments, placement groups can be seen as groupings of possible placements based on criteria like "best effort" to "dedicated & overprovisioned" service delivery. The trade-off between customer and provider utility may be considered in the context of the resources and services already in place.

In embodiments, the decision (analyse, compare and select) may be made by choosing the option which allows a balanced trade-off dependent on the business model. For example, a higher value of the customer-centric utility may be considered as implying a lower profit for the service-provider leading to a low value of the provider-centric utility. Thus, a balance may be made and the focus may be on choosing a placement which provides a good value for both the provider-centric and the customer-centric utility function. By projecting the minimum/maximum thresholds for e.g., the provider and the customer utility and the desired placement group (e.g., best effort vs. random) on the analysis plane the possible "valid" candidates can be highlighted and hence actuated upon. In alternate embodiments, other options like multi-level optimizations can be applied to this analysis plane too.

Furthermore, the methodology may allow the orchestrator to adapt, as the business incentive changes, favour one attribute or one sub-utility function as desired. In addition, the quantification of these attributes and the formal expression of the utility functions for the provider and customer pave the way for the application of optimization algorithms and techniques which take into account business objectives of both the service provider and customer.

At block 412, resources of the computing infrastructure may be allocated to the various service requests of the workload, in accordance with the selected placement solution. Allocation of resources may include e.g., but are not limited to, pinning virtual machines, container, or task to a CPU core, block and or object storage object association with disks and virtual network elements to physical network entities (NIC, Switches, . . . ), and so forth.

Referring now to FIG. 3 again, embodiments of the provider-centric attributes 302 and customer-centric attributes 304 with further details will be described.

I. Provider-centric attributes 302.

a) Revenue 312. In embodiments, the service provider may be considered as having a rate for provisioning the request depending on its actual runtime $T_r$ (in hrs) which depends on the placement of the request and can be predicted/is known from the SLA. There is an hourly rate related with each VM flavour (which defines the sizes for memory, disk, number of cores etc.) denoted as $R_{flavour}$ and every SLA template denoted as $R_{SLA}$. Additionally, each fault tolerant procedure $e \in E$ that can be implemented by the service provider may be represented by a tuple {Name of Procedure, $R_e$, $\lambda$}. E may be defined as a set of fault tolerant procedures which can be implemented. These can range from configuring space and time redundancy, enabling matrix or vector-level checksum, pre-emptive job migration as well as defined exception handling. Here $R_e$ may be the rate at which this procedure is available, determined by calculated the reserved extra resources value and $\lambda_s$ is a 0-1 value indicating whether this procedure has been requested by the customer or not. Thus, for these embodiments, revenue may be considered as composed of three parts:
  i. Service price per VM flavor=$T_r * \Sigma_{VMs} R_{flavor}$
  ii. SLA price per SLA template=$T_r * \Sigma_{SLAs} R_{SLA}$
  iii. Failure Tolerance Cost=$T_r * \Sigma_{|E|} \lambda_s * R_e$ b) Expenditure 314. In embodiments, the service provider may be considered as incurring cost when provisioning a request related to each requested resource. The hourly rate for provisioning the node may be denoted as $R_n$ and its service/maintenance rate may be denoted as $M_n$. The number of cores on the VM v is indicated by $cores_v$ and on the host server as $cores_n$. Additional costs may be related to powering and cooling the systems and the mean power cost is $\overline{power}$ \$/kWh. For every SLA Violation, j $\epsilon$J represents the cost paid for the violation and $\overline{j}$ represents the corresponding number of times this violation occurs. Thus, for these embodiments, expenditure may be considered as composed of:
  i. Server and Equipment Costs (depending on cores in VM and on the host server) =
$$T_r * |\mathcal{N}_{compute}| * \frac{cores_v}{cores_n} R_n,$$

where n is in the compute resource in the infrastructure
  ii. Service and Maintenance Cost=$T_r * M_n$
  iii. Power Consumption and $$\text{Cooling Costs} = \frac{cores_v}{cores_n} * T_r * \overline{power} * R_n$$

iv. Network Connections Costs=$T_r * \Sigma | \mathcal{A}_{networkElement} | * R_{networkElement}$, where a network element can be a switch, a router etc. in the network plane represented by set $N_{networkElement}$ with provisioning rate $R_{networkElement}$
  v. SLA Violations=$\Sigma_{j \in J} j * \overline{j}$.

Profit. In embodiments, using the above stated definitions, utility profit may be defined as $\mathcal{P}$=Revenue−Expenditure to represent both the Revenue and Expenditure. Its utility function may be modelled on $$p(\%) = \frac{p}{\text{Expenditure}} * 100.$$

When depicting this as a utility function, a minimum profit level might be set by the service provider, represented by $\mathcal{P}$(min) which must be attained. Thus, for these embodiments, the utility function may be mathematically formulated as below:

$$\mathcal{U}(P) = \begin{cases} p(\%), & p > p_{(min)} \\ 0, & p = p_{(min)} \\ p(\%), & p < p_{(min)} \end{cases}$$

c) Data Locality 316. In embodiments, this attribute may define the degree to which the placement must consider data locality for node n over time $\tau$ and is denoted by $\mathcal{D}_n$. The information may be derived from these variables:
  i. The number of data packets to be transferred $\delta$
  ii. Rate of transmission f(n)
  iii. The one-hop packet transmission cost to/from node n over the entire time it takes to transmit. This includes transmission from node $n_1$ (which is the data producing node) indicated by $w(n_1, n)$ and transmission to node $n_2$ (which is the data storing node) indicated by $w(n, n_2)$.
  iv. The distance between the nodes indicated by the number of switches that lie on the shortest path indicated by $d(n_1, n)$ and $d(n, n_2)$, where $n_1, n_2$ are the data producing and data storing nodes respectively. [Note: By using the number of switches, the nodes may be allowed to be in different ranks or in different data-centres.]
  v. Access Frequency of these data packets node n over time period $\tau$ given by $\alpha_n^\tau$.

The total cost of transferring the data to node n denoted by $\mathcal{E}(\Sigma_n)$ and the access frequency of the data $\alpha_n^\tau$, may determine whether the data should be localized on node n or not. As $$\mathcal{E}(\mathcal{D}_n) \propto \frac{\delta}{f(n)} * (w(n, n_1) * d(n, n_1) + w(n, n_2) * d(n, n_2)),$$

the data locality for the node can be defined as a multiplicative function of access frequency and cost. Thus, for these embodiments, the utility function for data locality of a placement, depicted by $\mathcal{U}(\Sigma)$ may be given by:
$$\mathcal{U}(\Sigma) = \Sigma \Sigma_n = \Sigma \alpha_n^\tau * \mathcal{E} * (\Sigma_n)$$

In some embodiments, the various values can also be derived from the table below:

| $\mathcal{E}(\Sigma_n)$: Cost | $a_n^\tau$: Access Frequency | $D_n$: Data Locality |
|---|---|---|
| Low | Low | Not required |
| Low | High | Not required |
| High | Low | Not required |
| High | High | Required |

[Notes: 1) It is possible that $n_1 == n_2$. 2) Partitioning of data is not considered for this formulation. 3) If $n == n_1$ or $n == n_2$, then $d(n, n) = 0$ and $w(n, n) = 0$].

d) Data Replication 318. In embodiments, this attribute may define the number of replications that should ideally be maintained by service providers to ensure performance. Once the cumulative access frequency of the data increases for all nodes n in a particular data-centre $x \in \mathcal{X}$ over time period $\tau$ and goes beyond a threshold $\theta$, the data may be considered for replication. $\mathcal{X}$ is the set of data centers and x defines one such data center. The value of $\theta$ may be decided by the service-provider and depend on the cost of replication. This can be stated as:
  $\Sigma_{n \in x} \alpha_n^\tau > \theta \Rightarrow$ replication II. Customer-centric attributes 322.
  A) Service component locality/anti-locality 332. In embodiments, for service component locality requirements, including geo-location, hybrid computing and IoT scenarios, a modified request graph may be created by using the concepts of edge contraction. Embodiments may make use of Edmund's blossom as presented for matching algorithms in any graph. See e.g., J. Edmonds, "Paths, Trees, and Flowers," in Classic Papers in Combinatorics, Springer, 2009, pp. 361-379. for further details. For example. if two nodes in the request graph need to be on the same service component, the edge between them on the graph may be contracted, so that the orchestrator now sees one node, ensuring that both original nodes are assigned to the same service component.

(b) Availability 334. In embodiments, availability of node n may be represented as $A_n^\tau$ and may be mapped to the capacity $C_n^t$ of the node, as shown:

$$A_n^t = K * C_n^t$$

where K is a constant used to normalize and map the value of capacity to availability.

In embodiments, a linear utility function may be defined for availability of node n indicated by $\mathcal{U}(A)$ over the run-time. The values of the normalization variables $y_1$ and $y_2$ used to normalize the utility values between [0, 1] may be derived by replacing best and worst values for the availability as acceptable by customer, as the boundary conditions will be $\mathcal{U}_n(A_n)^{worst}=0$ and $\mathcal{U}_n(A_n)^{best}=1$ at all time-instances.

$$\mathcal{U}(A) = \sum_{t \in T_r} y_1 * A_n^t + y_2$$

(c) Network Throughput 336. In embodiments, the network utility links may be studied in context of the communication links between different resources. As stated before, $l \in \mathcal{L}$ may be a communication link within communication link set $\mathcal{L}$ with capacity $c_l$. Node n may transmit a flow over a set of the links, indicated by path P at the source rate of $f_n$ (the transmission rate) whilst ensuring capacity bounds and within the utilization parameters of each network interface card encountered in path P. Thus, a utility of the node may be represented as $\mathcal{U}(T)$ which may be maximized over all nodes. This utility function may be defined as a log function, since it may be concave, differentiable, and non-decreasing.

$$\mathcal{U}(T) = y_3 \log(f_n) \; s.t: \; y_3 > 0 \text{ and } f_n \leq c_l, \; \forall l \in P$$

(d) Response Time 338. In embodiments, response time $t_r$ may refer to the time at which a task is completed and $T_r$ is the time taken for the same. Arrival time may be represented as $t_a$, expected completion time value as $t_e$. Also, some amount of delay may be acceptable to the customer beyond expected completion time of the job indicated by s. In an ideal situation, the relation between these time instances can be shown: $t_j \leq t_r = t_e$. Thus, for these embodiments, the utility function for response time can then be presented as:

$$\mathcal{U}(Rt) = \begin{cases} 1, & t_r \leq t_e \\ -y_4(t_r - s), & t_e + s < t_r \\ -1, & \text{otherwise} \end{cases}$$

(e) Latency 340. In embodiments, the latency experienced for a workload may be mainly dependent on serialization, queueing delay, routing latencies and propagation delay. This may be modelled by using the factors below:

i. Number of shared cores or 'Degree of Core Isolation' may be denoted by $I_n$ for node n as:

$$I_n = \frac{cores_n}{\Sigma_v cores_v}$$

ii. Serialization Latency denoted by $L_s$, may be dependent on data sizes transferred (total denoted by $\rho$ and f(n) which is the transmission rate).

$$L_s = \sigma_1 * \frac{\rho}{f(n)}$$

iii. Queueing Latency denoted by $L_q$ may be a summation of queuing delay $Q_n$ for each node n over response time $T_r$ (The delay experienced due to a resource or node n being saturated, indicated by its saturation value $S_n^t$ at time t and unable to process further requests).

$$L_q = \Sigma_n Q_n = \sigma_2 \Sigma_n \Sigma_{t_a \leq t \leq t_y} S_n^t$$

iv. Propagation Delay denoted by $L_p$ may be dependent on the summation of the geographical length covered by the request (distance to user):

$$L_p = \sigma_3 \sum_p len(l), \; \forall l \in P, \; \forall P$$

v. Routing Latency denoted by $L_r$ may be dependent on the latency due to the various switches and routers.

$$L_r = \sigma_4 * \mathcal{R}_{routers}|$$

$\sigma 1$, $\sigma 2$, $\sigma 3$, and $\sigma 4$ are constants used to relate the terms in the definitions. $\mathcal{R}_{routers}$ defines the set of routers present as resources.

Thus, the utility function for latency, denoted by $\mathcal{U}(Lt)$ given in SLA and penalty can be defined as l given in SLA and penalty can be defined as:

$$\mathcal{U}(Lt) = y_5 * \sum_n I_n * e^{\left(\frac{y_6}{L_s + L_q + L_p + L_r}\right)}$$

Variables $y_1$, $y_2$, $y_3$, $y_4$, $y_5$, and $y_6$ are constants for normalization.

III. Provider and Customer Utility.

For these embodiments, the provider-centric utility function for a potential placement/rebalancing solution (eq. (1)) may instead be expressed as follows:

$$\mathcal{U}_s = (\alpha_1 * \mathcal{U}(P) + \beta_1) * (\alpha_2 * \mathcal{U}(D) + \beta_2) * (\alpha_3 * \mathcal{U}(R) + \beta_3) \; s.t. \; \alpha_1 + \alpha_2 + \alpha_3 \quad (3)$$

The customer-centric utility function for a potential placement/rebalancing solution (eq. (2)) may instead be expressed as follows:

$$\mathcal{U}_e = (\alpha_4 * \mathcal{U}(L) + \beta_4) * (\alpha_5 * \mathcal{U}(A) + \beta_5) * (\alpha_6 * \mathcal{U}(T) + \beta_6) * (\alpha_7 * \mathcal{U}(Rt) + \beta_7) * (\alpha_8 * \mathcal{U}(Lt) + \beta_8) \; s.t. \; \alpha_4 + \alpha_5 + \alpha_6 + \alpha_7 + \alpha_8 = 1 \quad (4)$$

Figure 5:
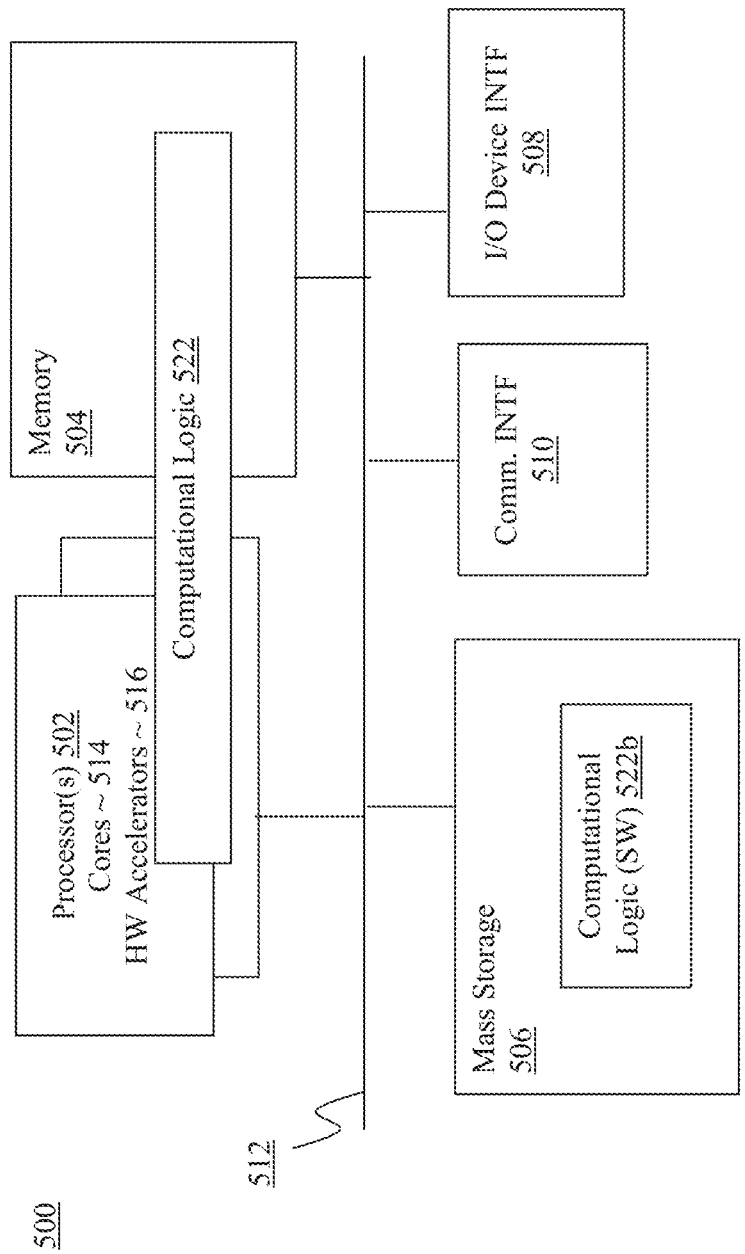
FIG. 5 illustrates an example computing device suitable for use to practice aspects of the present disclosure, according to various embodiments.

FIG. 5 illustrates an example computing device suitable for use to practice aspects of the present disclosure, according to various embodiments. As shown, computing device 500 may include one or more hardware processors 502, each having one or more hardware processor cores 514 and optionally, one or more hardware accelerators 516, and system memory 504. Additionally, computing device 500 may include input/output device interfaces 508 (for interfacing with I/O devices such as display, keyboard, cursor control and so forth) and communication interfaces 510 for communication devices (such as network interface cards, modems and so forth). The elements may be communicatively coupled to each other via system bus 512, which may represent one or more buses. In the case of multiple buses, they may be bridged by one or more bus bridges (not shown). Additionally, computing device 500 may include mass storage devices 506 (such as diskette, hard drive, compact disc read only memory (CD-ROM) and so forth).

Each of these elements may perform its conventional functions known in the art. In embodiments, system memory 504 and mass storage devices 506 may be employed to store a working copy and a permanent copy of the programming instructions implementing an operating system and various applications, in particular, the operating logic for potential placement solution generator 202, one or more utility function calculators 204-206, an analyzer 208 and a resource allocator 210, collectively referred to as computational logic 522. As shown, aspects of computational logic 522, e.g., some functions of utility function calculators 204-206, may be implemented in hardware accelerator 516. The software portion of computational logic 522 may be implemented by assembler instructions supported by hardware processor(s) 502 or high-level languages, such as, for example, C, that can be compiled into such instructions.

The number, capability and/or capacity of these elements 510-512 may vary, depending on whether computing device 500 is used as a compute resource 112, a client system 104 or computing infrastructure resource-workload manager 120. Otherwise, the constitutions of elements 510-512 are known, and accordingly will not be further described.

Figure 6:
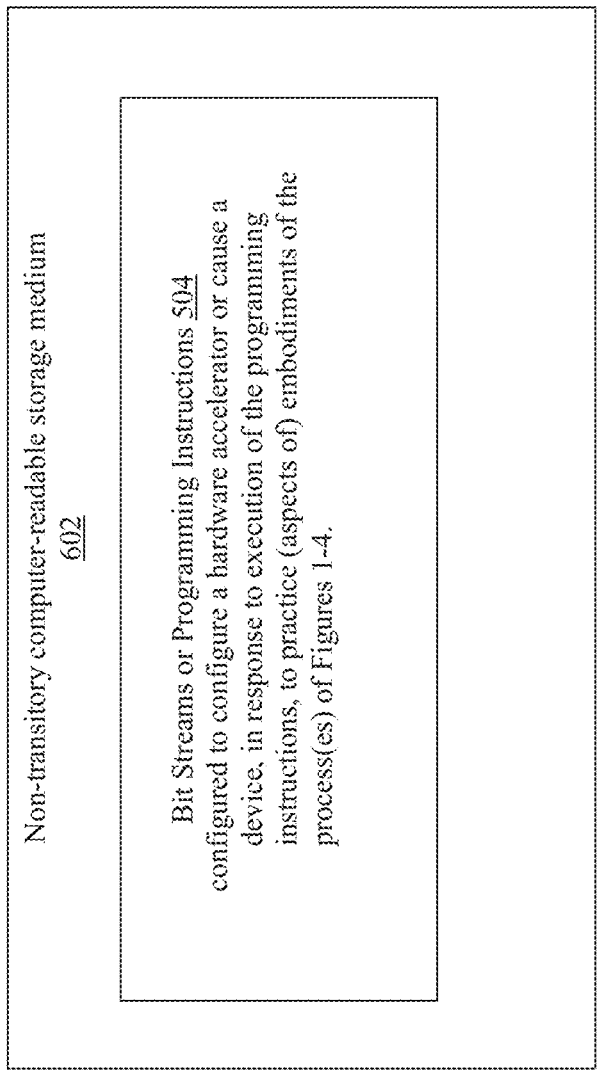
FIG. 6 illustrates an example storage medium having bit streams to configure a hardware accelerator or instructions to cause an apparatus to practice aspects of the present disclosure, according to various embodiments.

FIG. 6 illustrates an example storage medium having bit streams to configure a hardware accelerator or instructions to cause an apparatus to practice aspects of the present disclosure, according to various embodiments. As shown, non-transitory computer-readable storage medium 502 may include a number of bit streams or programming instructions 604. Bit streams 604 may be employed to configure hardware accelerators to perform e.g., various operations associated with some functions of utility function calculators 204-206. Programming instructions 604 may be configured to enable a computing device, e.g., computing device 500, in response to execution of the programming instructions, to perform, e.g., various operations associated with potential placement solution generator 202, one or more utility function calculators 204-206, an analyzer 208 and a resource allocator 210, described with references to FIGS. 1-4. In alternate embodiments, bit streams or programming instructions 604 may be disposed on multiple computer-readable non-transitory storage media 602 instead. In alternate embodiments, bit streams or programming instructions 904 may be disposed on computer-readable transitory storage media 602, such as, signals.

Referring back to FIG. 5, for one embodiment, at least one of hardware processors 502 may be packaged together with memory having computational logic 522 (in lieu of storing on memory 504 and storage 506). For one embodiment, at least one of hardware processors 502 may be packaged together with memory having aspects of computational logic 522 to form a System in Package (SiP). For one embodiment, at least one of hardware processors 502 may be integrated on the same die with memory having aspects of computational logic 522. For one embodiment, at least one of hardware processors 502 may be packaged together with memory having aspects of computational logic 522 to form a System on Chip (SoC).

Thus various example embodiments of the present disclosure have been described including, but are not limited to:

Example 1 may be an apparatus for managing resources and their assigned workloads of a computing infrastructure, comprising: a resource-workload manager having: a placement solution generator to receive resource data and workload data for the computing infrastructure, and generate a plurality of potential resource placement solutions for allocation of the various resources of the computing infrastructure to various components of the various workloads; one or more utility function calculators communicatively coupled with the placement solution generator to calculate one or more values for one or more provider-centric attributes, and one or more values for one or more customer-centric attributes, for the plurality of potential resource placement solutions; an analyzer communicatively coupled to the one or more utility function calculators to analyze the attributes and select one of the potential resource placement solutions; and a resource allocator communicatively coupled to analyzer to allocate the resources of the computing infrastructure, based at least in part on the selected resource placement solution.

Example 2 may be example 1, wherein the one or more utility function calculators may include an utility function calculator to calculate values for the one or more provider-centric attributes, for the plurality of potential resource placement solutions.

Example 3 may be example 2, wherein the one or more provider-centric attributes may comprise one or more of a revenue attribute, an expenditure attribute, a profit attribute $\mathcal{U}(P)$, a data locality attribute $\mathcal{U}(\mathcal{D})$, and a data replication attribute $\mathcal{U}(R)$.

Example 4 may be example 3, wherein the plurality of provider-centric attributes may comprise a revenue attribute that details an amount of credit ($) a provider of the computing infrastructure would gain by hosting a service with a particular resource placement solution, an expenditure attribute that details the total cost of ownership in credits ($) of the resources in a particular resource placement solution, or a profit attribute $\mathcal{U}(P)$ of a particular resource placement solution derived from the revenue and expenditure attributes of the particular resource placement solution.

Example 5 may be example 3, wherein the plurality of provider-centric attributes may comprise a data locality attribute $\mathcal{U}(\mathcal{D})$ that details distance or access frequency between compute resources and storage resources of the computing infrastructure a particular resource placement solution, or a data replication attribute $\mathcal{U}(R)$ that details a number of possible data/storage replicas the computing infrastructure has to deal with for fault-tolerance/high availability/performance issues for a particular resource placement solution.

Example 6 may be example 3 wherein the utility function calculator may further calculate a provider utility $\mathcal{U}_s$ for each of the plurality of potential resource placement solutions, based at least in part on the corresponding calculated values for the plurality of provider-centric attributes for the particular potential resource placement solution:

$$\mathcal{U}_s = (\alpha_1 * \mathcal{U}(P) + \beta_1) * (\alpha_2 * \mathcal{U}(\mathcal{D}) + \beta_2) * (\alpha_3 * \mathcal{U}(R) + \beta_3)$$

where $\alpha_1$, $\alpha_2$, and $\alpha_3$ are relative weights of profit attribute $\mathcal{U}(P)$, data locality attribute $\mathcal{U}(\mathcal{D})$, and data replication attribute $\mathcal{U}(R)$, and $\beta_1$, $\beta_2$, and $\beta_3$ are additive weights that store dependence on other attributes.

Example 7 may be example 1, wherein the one or more utility function calculators may include an utility function calculator to calculate values for one or more customer-centric attributes, for the plurality of potential solutions.

Example 8 may be example 7, wherein the one or more customer-centric attributes may comprise at least two attributes selected from an attribute group that may include a service components locality or anti-locality attribute $\mathcal{U}(L)$, an availability attribute $\mathcal{U}(A)$ network throughput attribute $\mathcal{U}(T)$, a response time attribute $\mathcal{U}(Rt)$, and a latency attribute) $\mathcal{U}(Lt)$.

Example 9 may be example 8, wherein the one or more customer-centric attributes may comprise a service components locality or anti-locality attribute $\mathcal{U}(L)$ that details the requirements of a workload to be hosted by a resource placement solution in one or in separated locations of the computing infrastructure.

Example 10 may be example 8, wherein the one or more customer-centric attributes may comprise a service components an availability attribute $\mathcal{U}(A)$ that details the desired availability of a service for a particular workload, or a network throughput attribute $\mathcal{U}(T)$ that detail a desired minimum network throughput a service of a particular workload needs.

Example 11 may be example 8, wherein the one or more customer-centric attributes may comprise a service components a response time attribute $\mathcal{U}(Rt)$ that details a time at which a task of a workload may be completed, and a latency attribute $\mathcal{U}(Lt)$ that details a maximum desired latency between two service components of a particular workload.

Example 12 may be example 8, wherein the utility function calculator may further calculate a customer utility $\mathcal{U}_e$ for each of the plurality of potential resource placement solutions, based at least in part on the corresponding calculated values for the one or more provider-centric attributes for the particular potential resource placement solution:

$$\mathcal{U}_e = (\alpha_4 * \mathcal{U}(L) + \beta_4) * (\alpha_5 * \mathcal{U}(A) + \beta_5) * (\alpha_6 * \mathcal{U}(T) + \beta_6) * (\alpha_7 * \mathcal{U}(Rt) + \beta_7) * (\alpha_8 * \mathcal{U}(Lt) + \beta_8)$$

where $\alpha_4$, $\alpha_5$, $\alpha_6$, $\alpha_7$, and $\alpha_8$ are relative weights of locality or anti-locality attribute $\mathcal{U}(L)$, availability attribute $\mathcal{U}(A)$, network throughput attribute $\mathcal{U}(T)$, response time attribute $\mathcal{U}(Rt)$ and latency attribute $\mathcal{U}(Lt)$, and $\beta_4$, $\beta_5$, $\beta_6$, $\beta_7$, and $\beta_8$ are additive weights that store dependence on other attributes.

Example 13 may be any one of examples 1-12, further comprising a hardware processor to operate the computing infrastructure resource-workload manager.

Example 14 may be example 13, wherein the hardware processor may include one or more processor cores respectively dedicated to operate the one or more utility function calculators.

Example 15 may be example 13, wherein where the hardware processor may include one or more processor cores, and one or more hardware accelerators, wherein the one or more hardware accelerators are respectively dedicated to operate the one or more utility function calculators.

Example 16 may be a method for managing resources and their assigned workloads of a computing infrastructure, comprising: receiving, by a placement solution generator of a resource-workload manager operating on a computing device, resource data and workload data for the computing infrastructure; generating, by the placement solution generator, a plurality of potential resource placement solutions for allocation of the various resources of the computing infrastructure to various components of the various workloads; calculating, by one or more utility function calculators of the resource-workload manager, one or more values for one or more provider-centric attributes, and one or more values for one or more customer-centric attributes, for the plurality of potential resource placement solutions; analyzing, by an analyzer of the resource-workload manager, the attributes and selecting one of the potential resource placement solutions; and allocating, by a resource allocator of the resource-workload manager, the resources of the computing infrastructure, based at least in part on the selected resource placement solution.

Example 17 may be example 16, wherein calculating may comprise calculating values for the one or more provider-centric attributes, for the plurality of potential resource placement solutions.

Example 18 may be example 17, wherein the one or more provider-centric attributes may comprise one or more of a revenue attribute, an expenditure attribute, a profit attribute $\mathcal{U}(P)$, a data locality attribute $\mathcal{U}(\mathcal{D})$, and a data replication attribute $\mathcal{U}(R)$.

Example 19 may be example 18, wherein the plurality of provider-centric attributes may comprise a revenue attribute that details an amount of credit ($) a provider of the computing infrastructure would gain by hosting a service with a particular resource placement solution, an expenditure attribute that details the total cost of ownership in credits ($) of the resources in a particular resource placement solution, or a profit attribute $\mathcal{U}(P)$ of a particular resource placement solution derived from the revenue and expenditure attributes of the particular resource placement solution.

Example 20 may be example 18, wherein the plurality of provider-centric attributes may comprise a data locality attribute $\mathcal{U}(\pi)$ that details distance or access frequency between compute resources and storage resources of the computing infrastructure a particular resource placement solution, or a data replication attribute $\mathcal{U}(R)$ that details a number of possible data/storage replicas the computing infrastructure has to deal with for fault-tolerance/high availability/performance issues for a particular resource placement solution.

Example 21 may be example 18 wherein calculating further may comprise calculating a provider utility $\mathcal{U}_s$ for each of the plurality of potential resource placement solutions, based at least in part on the corresponding calculated values for the plurality of provider-centric attributes for the particular potential resource placement solution:

$$\mathcal{U}_s = (\alpha_1 * \mathcal{U}(P) + \beta_1) * (\alpha_2 * \mathcal{U}(\mathcal{D}) + \beta_2) * (\alpha_3 * \mathcal{U}(R) + \beta_3)$$

where $\alpha_1$, $\alpha_2$, and $\alpha_3$ are relative weights of profit attribute $\mathcal{U}(P)$, data locality attribute $\mathcal{U}(\mathcal{D})$, and data replication attribute $\mathcal{U}(R)$, and $\beta_1$, $\beta_2$, and $\beta_3$ are additive weights that store dependence on other attributes.

Example 22 may be any one of examples 16-21, wherein calculating may comprise calculating values for one or more customer-centric attributes, for the plurality of potential solutions.

Example 23 may be example 22, wherein the one or more customer-centric attributes may comprise at least two attributes selected from an attribute group that may include a service components locality or anti-locality attribute $\mathcal{U}(L)$, an availability attribute $\mathcal{U}(A)$, a network throughput attribute $\mathcal{U}(T)$, a response time attribute $\mathcal{U}(Rt)$, and a latency attribute $\mathcal{U}(Lt)$.

Example 24 may be example 23, wherein the one or more customer-centric attributes may comprise a service components locality or anti-locality attribute $\mathcal{U}(L)$ that details the requirements of a workload to be hosted by a resource placement solution in one or in separated locations of the computing infrastructure.

Example 25 may be example 23, wherein the one or more customer-centric attributes may comprise a service components an availability attribute $\mathcal{U}(A)$ that details the desired availability of a service for a particular workload, or a network throughput attribute) $\mathcal{U}(T)$ that detail a desired minimum network throughput a service of a particular workload needs.

Example 26 may be example 23, wherein the one or more customer-centric attributes may comprise a service components a response time attribute $\mathcal{U}(Rt)$ that details a time at which a task of a workload may be completed, and a latency attribute $\mathcal{U}(Lt)$ that details a maximum desired latency between two service components of a particular workload.

Example 27 may be example 23, wherein calculating further may comprise calculating a customer utility $\mathcal{U}_e$ for each of the plurality of potential resource placement solutions, based at least in part on the corresponding calculated values for the one or more provider-centric attributes for the particular potential resource placement solution:

$$\mathcal{U}_e=(\alpha_4*\mathcal{U}(L)+\beta_4)*(\alpha_5*\mathcal{U}(A)+\beta_5)*(\alpha_6*\mathcal{U}(T)+\beta_6)*(\alpha_7*\mathcal{U}(Rt)+\beta_7)*(\alpha_8*\mathcal{U}(Lt)+\beta_8)$$

where $\alpha_4$, $\alpha_5$, $\alpha_6$, $\alpha_7$, and $\alpha_8$ are relative weights of locality or anti-locality attribute) $\mathcal{U}(L)$, availability attribute $\mathcal{U}(A)$, network throughput attribute $\mathcal{U}(T)$, response time attribute $\mathcal{U}(Rt)$, and latency attribute $\mathcal{U}(Lt)$, and $\beta_4$, $\beta_5$, $\beta_6$, $\beta_7$, and $\beta_8$ are additive weights that store dependence on other attributes.

Example 28 may be one or more computer-readable media (CRM) comprising instructions that cause a computing device, in response to execution of the instructions by a hardware processor, to operate a resource-workload manager of a computing infrastructure to: receive resource data and workload data for the computing infrastructure; generate a plurality of potential resource placement solutions for allocation of the various resources of the computing infrastructure to various components of the various workloads; calculate one or more values for one or more provider-centric attributes, and one or more values for one or more customer-centric attributes, for the plurality of potential resource placement solutions; analyze the attributes and selecting one of the potential resource placement solutions; and allocating the resources of the computing infrastructure, based at least in part on the selected resource placement solution.

Example 29 may be example 28, wherein to calculate may comprise to calculate values for the one or more provider-centric attributes, for the plurality of potential resource placement solutions.

Example 30 may be example 29, wherein the one or more provider-centric attributes may comprise one or more of a revenue attribute, an expenditure attribute, a profit attribute $\mathcal{U}(P)$, a data locality attribute $\mathcal{U}(\mathcal{D})$ and a data replication attribute $\mathcal{U}(R)$.

Example 31 may be example 30, wherein the plurality of provider-centric attributes may comprise a revenue attribute that details an amount of credit ($) a provider of the computing infrastructure would gain by hosting a service with a particular resource placement solution, an expenditure attribute that details the total cost of ownership in credits ($) of the resources in a particular resource placement solution, or a profit attribute $\mathcal{U}(P)$ of a particular resource placement solution derived from the revenue and expenditure attributes of the particular resource placement solution.

Example 32 may be example 30, wherein the plurality of provider-centric attributes may comprise a data locality attribute $\mathcal{U}(\mathcal{D})$ that details distance or access frequency between compute resources and storage resources of the computing infrastructure a particular resource placement solution, or a data replication attribute $\mathcal{U}(R)$ that details a number of possible data/storage replicas the computing infrastructure has to deal with for fault-tolerance/high availability/performance issues for a particular resource placement solution.

Example 33 may be example 30 wherein to calculate further may comprise to calculate a provider utility $\mathcal{U}_s$ for each of the plurality of potential resource placement solutions, based at least in part on the corresponding calculated values for the plurality of provider-centric attributes for the particular potential resource placement solution:

$$\mathcal{U}_s=(\alpha_1*\mathcal{U}(P)+\beta_1)*(\alpha_2*\mathcal{U}(\mathcal{D})+\beta_2)*(\alpha_3*\mathcal{U}(R)+\beta_3)$$

where $\alpha_1$, $\alpha_2$, and $\alpha_3$ are relative weights of profit attribute $\mathcal{U}(P)$, data locality attribute $\mathcal{U}(\mathcal{D})$, and data replication attribute $\mathcal{U}(R)$, and $\beta_1$, $\beta_2$, and $\beta_3$ are additive weights that store dependence on other attributes.

Example 34 may be any one of examples 28-33, wherein the one or more utility function calculators may include an utility function calculator to calculate values for one or more customer-centric attributes, for the plurality of potential solutions.

Example 35 may be example 34, wherein the one or more customer-centric attributes may comprise at least two attributes selected from an attribute group that may include a service components locality or anti-locality attribute $\mathcal{U}(L)$, an availability attribute $\mathcal{U}(A)$, a network throughput attribute $\mathcal{U}(T)$, a response time attribute $\mathcal{U}(Rt)$, and a latency attribute $\mathcal{U}(Lt)$.

Example 36 may be example 35, wherein the one or more customer-centric attributes may comprise a service components locality or anti-locality attribute $\mathcal{U}(L)$ that details the requirements of a workload to be hosted by a resource placement solution in one or in separated locations of the computing infrastructure.

Example 37 may be example 36, wherein the one or more customer-centric attributes may comprise a service components an availability attribute $\mathcal{U}(A)$ that details the desired availability of a service for a particular workload, or a network throughput attribute $\mathcal{U}(T)$ that detail a desired minimum network throughput a service of a particular workload needs.

Example 38 may be example 35, wherein the one or more customer-centric attributes may comprise a service components a response time attribute $\mathcal{U}(Rt)$ that details a time at which a task of a workload may be completed, and a latency attribute $\mathcal{U}(Lt)$ that details a maximum desired latency between two service components of a particular workload.

Example 39 may be example 35, wherein to calculate further may comprise to calculate a customer utility $\mathcal{U}_e$ for each of the plurality of potential resource placement solutions, based at least in part on the corresponding calculated values for the one or more provider-centric attributes for the particular potential resource placement solution:

$$\mathcal{U}_e=(\alpha_4*\mathcal{U}(L)+\beta_4)*(\alpha_5*\mathcal{U}(A)+\beta_5)*(\alpha_6*\mathcal{U}(T)+\beta_6)*(\alpha_7*\mathcal{U}(Rt)+\beta_7)*(\alpha_8*\mathcal{U}(Lt)+\beta_8)$$

where $\alpha_4$, $\alpha_5$, $\alpha_6$, $\alpha_7$, and $\alpha_8$ are relative weights of locality or anti-locality attribute $\mathcal{U}(L)$, availability attribute $\mathcal{U}(A)$, network throughput attribute $\mathcal{U}(T)$, response time attribute $\mathcal{U}(Rt)$, and latency attribute $\mathcal{U}(Lt)$, and $\beta_4$, $\beta_5$, $\beta_6$, $\beta_7$, and $\beta_8$ are additive weights that store dependence on other attributes.

Example 40 may be an apparatus for managing resources and their assigned workloads of a computing infrastructure, comprising: means for receiving resource data and workload data for the computing infrastructure, and generating a plurality of potential resource placement solutions for allocating the various resources of the computing infrastructure to various components of the various workloads; means for calculating one or more values for one or more provider-centric attributes, and one or more values for one or more customer-centric attributes, for the plurality of potential resource placement solutions; means for analyzing the attributes, and selecting one of the potential resource placement solutions; and means for allocating the resources of the computing infrastructure, based at least in part on the selected resource placement solution.

Example 41 may be example 40, wherein means for calculating may comprise means for calculating values for the one or more provider-centric attributes, for the plurality of potential resource placement solutions.

Example 42 may be example 41, wherein the one or more provider-centric attributes may comprise one or more of a revenue attribute, an expenditure attribute, a profit attribute $\mathcal{U}(P)$, a data locality attribute $\omega(\mathcal{D})$, and a data replication attribute $\omega(R)$.

Example 43 may be example 42, wherein the plurality of provider-centric attributes may comprise a revenue attribute that details an amount of credit ($) a provider of the computing infrastructure would gain by hosting a service with a particular resource placement solution, an expenditure attribute that details the total cost of ownership in credits ($) of the resources in a particular resource placement solution, or a profit attribute $\omega(P)$ of a particular resource placement solution derived from the revenue and expenditure attributes of the particular resource placement solution.

Example 44 may be example 42, wherein the plurality of provider-centric attributes may comprise a data locality attribute $\omega(L)$ that details distance or access frequency between compute resources and storage resources of the computing infrastructure a particular resource placement solution, or a data replication attribute $\omega(R)$ that details a number of possible data/storage replicas the computing infrastructure has to deal with for fault-tolerance/high availability/performance issues for a particular resource placement solution.

Example 45 may be example 42, wherein means for calculating further may comprise means for calculating a provider utility $\mathcal{U}_s$ for each of the plurality of potential resource placement solutions, based at least in part on the corresponding calculated values for the plurality of provider-centric attributes for the particular potential resource placement solution:

$$\mathcal{U}_s=(\alpha_1*\mathcal{U}(P)+\beta_1)*(\alpha_2*\mathcal{U}(\mathcal{D})+\beta_2)*(\alpha_3*\mathcal{U}(R)+\beta_3)$$

where $\alpha_1$, $\alpha_2$, and $\alpha_3$ are relative weights of profit attribute $\mathcal{U}(P)$, data locality attribute $\mathcal{U}(\mathcal{D})$, and data replication attribute $\mathcal{U}(R)$, and $\beta_1$, $\beta_2$, and $\beta_3$, are additive weights that store dependence on other attributes.

Example 46 may be any one of examples 40-45, wherein means for calculating may comprise means for calculating values for the one or more customer-centric attributes, for the plurality of potential solutions.

Example 47 may be example 46, wherein the one or more customer-centric attributes may comprise at least two attributes selected from an attribute group that may include a service components locality or anti-locality attribute $\mathcal{U}(T)$, an availability attribute $\mathcal{U}(A)$ network throughput attribute $\mathcal{U}(T)$, a response time attribute $\mathcal{U}(Rt)$ and a latency attribute $\mathcal{U}(Lt)$.

Example 48 may be example 47, wherein the one or more customer-centric attributes may comprise a service components locality or anti-locality attribute $\mathcal{U}(L)$ that details the requirements of a workload to be hosted by a resource placement solution in one or in separated locations of the computing infrastructure.

Example 49 may be example 47, wherein the one or more customer-centric attributes may comprise a service components an availability attribute $\mathcal{U}(A)$ that details the desired availability of a service for a particular workload, or a network throughput attribute) $\mathcal{U}(T)$ that detail a desired minimum network throughput a service of a particular workload needs.

Example 50 may be example 47, wherein the one or more customer-centric attributes may comprise a service components a response time attribute $\mathcal{U}(Rt)$ that details a time at which a task of a workload may be completed, and a latency attribute $\mathcal{U}(Lt)$ that details a maximum desired latency between two service components of a particular workload.

Example 51 may be example 47, wherein means for calculating further may comprise means for calculating a customer utility $\mathcal{U}_e$ for each of the plurality of potential resource placement solutions, based at least in part on the corresponding calculated values for the one or more provider-centric attributes for the particular potential resource placement solution:

$$\mathcal{U}_e=(\alpha_4*\mathcal{U}(L)+\beta_4)*(\alpha_6*\mathcal{U}(A)+\beta_6)*(\alpha_6*\mathcal{U}(T)+\beta_6)*(\alpha_7*\mathcal{U}(Rt)+\beta_7)*(\alpha_8*\mathcal{U}(Lt)+\beta_8)$$

where $\alpha_4$, $\alpha_5$, $\alpha_6$, $\alpha_7$, and $\alpha_8$ are relative weights of locality or anti-locality attribute $\mathcal{U}(L)$, availability attribute $\mathcal{U}(A)$, network throughput attribute $\mathcal{U}(T)$, response time attribute $\mathcal{U}(Rt)$, and latency attribute $\mathcal{U}(Lt)$, and $\beta_4$, $\beta_5$, $\beta_6$, $\beta_7$, and $\beta_8$ are additive weights that store dependence on other attributes.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An apparatus for managing resources and their assigned workloads of a computing infrastructure, comprising:
   a hardware processor;
   a resource-workload manager operated by the hardware processor, the resource-workload manager having:
   a placement solution generator to receive resource data and workload data for the computing infrastructure, and generate a plurality of potential resource placement solutions for allocation of the resources of the computing infrastructure to various components of the workloads;

one or more utility function calculators communicatively coupled with the placement solution generator to calculate one or more values for one or more provider-centric attributes, and one or more values for one or more customer-centric attributes, for the plurality of potential resource placement solutions;

an analyzer communicatively coupled to the one or more utility function calculators to analyze the values of the provider-centric and customer-centric attributes and select one of the potential resource placement solutions based at least in part on the analyzed values; and a resource allocator communicatively coupled to the analyzer to allocate the resources of the computing infrastructure, based at least in part on the selected resource placement solution.

2. The apparatus of claim 1, wherein the one or more utility function calculators include a utility function calculator to calculate the one or more values for the one or more provider-centric attributes, for the plurality of potential resource placement solutions.

3. The apparatus of claim 2, wherein the one or more provider-centric attributes comprise one or more of a revenue attribute, an expenditure attribute, a profit attribute $\mathcal{U}$ (P), a data locality attribute $\mathcal{U}$ ($\mathcal{D}$), and a data replication attribute $\mathcal{U}$ (R).

4. The apparatus of claim 3, wherein the plurality of provider-centric attributes comprise a revenue attribute that details an amount of credit ($) a provider of the computing infrastructure would gain by hosting a service with a particular resource placement solution, an expenditure attribute that details a total cost of ownership in credits ($) of the resources in a particular resource placement solution, or a profit attribute $\mathcal{U}$ (P) of a particular resource placement solution derived from the revenue and expenditure attributes of the particular resource placement solution.

5. The apparatus of claim 3, wherein the plurality of provider-centric attributes comprise a data locality attribute $\mathcal{U}$ ($\mathcal{D}$) that details distance or access frequency between compute resources and storage resources of the computing infrastructure, a particular resource placement solution, or a data replication attribute $\mathcal{U}$ (R) that details a number of possible data/storage replicas the computing infrastructure has to deal with for fault-tolerance/high availability/performance issues for a particular resource placement solution.

6. The apparatus of claim 3 wherein the utility function calculator is to further calculate a provider utility $\mathcal{U}_s$ for each of the plurality of potential resource placement solutions, based at least in part on the corresponding calculated values for the plurality of provider-centric attributes for the particular potential resource placement solution:

$$\mathcal{U}_s = (\alpha_1 * \mathcal{U}(P) + \beta_1) * (\alpha_2 * \mathcal{U}(\mathcal{D}) + \beta_2) * (\alpha_3 * \mathcal{U}(R) + \beta_3)$$

where $\alpha_1$, $\alpha_2$, and $\alpha_3$ are relative weights of profit attribute $\mathcal{U}$ (P), data locality attribute $\mathcal{U}$ ($\mathcal{D}$), and data replication attribute $\mathcal{U}$ (R), and $\beta_1$, $\beta_2$, and $\beta_3$ are additive weights that store dependence on other attributes.

7. The apparatus of claim 1, wherein the one or more utility function calculators include a utility function calculator to calculate the one or more values for one or more customer-centric attributes, for the plurality of potential solutions.

8. The apparatus of claim 7, wherein the one or more customer-centric attributes comprise at least two attributes selected from an attribute group that includes a service component locality or anti-locality attribute $\mathcal{U}$ (L), an availability attribute $\mathcal{U}$ (A), a network throughput attribute $\mathcal{U}$ (T), a response time attribute $\mathcal{U}$ (Rt), and a latency attribute $\mathcal{U}$ (Lt).

9. The apparatus of claim 8, wherein the one or more customer-centric attributes comprise a service component locality or anti-locality attribute $\mathcal{U}$ (L) that details requirements of a workload to be hosted by a resource placement solution in one or in separated locations of the computing infrastructure.

10. The apparatus of claim 8, wherein the one or more customer-centric attributes comprise a service component availability attribute $\mathcal{U}$ (A) that details a desired availability of a service for a particular workload, or a network throughput attribute $\mathcal{U}$ (T) that detail a desired minimum network throughput that a service of a particular workload needs.

11. The apparatus of claim 8, wherein the one or more customer-centric attributes comprise a service component response time attribute $\mathcal{U}$ (Rt) that details a time at which a task of a workload is to be completed, and a latency attribute $\mathcal{U}$ (Lt) that details a maximum desired latency between two service components of a particular workload.

12. The apparatus of claim 8, wherein the utility function calculator is to further calculate a customer utility $\mathcal{U}_e$ for each of the plurality of potential resource placement solutions, based at least in part on the corresponding calculated values for the one or more provider-centric attributes for the particular potential resource placement solution:

$$\mathcal{U}_e = (\alpha_4 * \mathcal{U}(L) + \beta_4) * (\alpha_5 * \mathcal{U}(A) + \beta_5) * (\alpha_6 * \mathcal{U}(T) + \beta_6) * (\alpha_7 * \mathcal{U}(Rt) + \beta_7) * (\alpha_8 * \mathcal{U}(Lt) + \beta_8)$$

where $\alpha_4$, $\alpha_5$, $\alpha_6$, $\alpha_7$, and $\alpha_8$ are relative weights of locality or anti-locality attribute $\mathcal{U}$ (L), availability attribute $\mathcal{U}$ (A), network throughput attribute $\mathcal{U}$ (T), response time attribute $\mathcal{U}$ (Rt), and latency attribute $\mathcal{U}$ (Lt), and $\beta_4$, $\beta_5$, $\beta_6$, $\beta_7$, and $\beta_8$ are additive weights that store dependence on other attributes.

13. The apparatus of claim 1, wherein the hardware processor includes one or more processor cores respectively dedicated to operate the one or more utility function calculators.

14. The apparatus of claim 1, wherein the hardware processor includes one or more processor cores, and one or more hardware accelerators, wherein the one or more hardware accelerators are respectively dedicated to operate the one or more utility function calculators.

15. A method for managing resources and their assigned workloads of a computing infrastructure, comprising:

receiving, by a placement solution generator of a resource-workload manager operating on a computing device, resource data and workload data for the computing infrastructure;

generating, by the placement solution generator, a plurality of potential resource placement solutions for allocation of the resources of the computing infrastructure to various components of the workloads;

calculating, by one or more utility function calculators of the resource-workload manager, one or more values for one or more provider-centric attributes, and one or more values for one or more customer-centric attributes, for the plurality of potential resource placement solutions;

analyzing, by an analyzer of the resource-workload manager, the values of the provider-centric and customer-centric attributes and selecting one of the potential resource placement solutions, based at least in part on the analyzed values; and allocating, by a resource allocator of the resource-workload manager, the resources of the computing infrastructure, based at least in part on the selected resource placement solution.

16. The method of claim 15, wherein calculating comprises calculating the values for the one or more provider-centric attributes, for the plurality of potential resource placement solutions; wherein the one or more provider-centric attributes comprise one or more of a revenue attribute, an expenditure attribute, a profit attribute $\mathcal{U}(P)$, a data locality attribute $\mathcal{U}(D)$, and a data replication attribute $\mathcal{U}(R)$; and wherein calculating comprises calculating values for one or more customer-centric attributes, for the plurality of potential solutions; wherein the one or more customer-centric attributes comprise at least two attributes selected from an attribute group that includes a service component locality or anti-locality attribute $\mathcal{U}(L)$, an availability attribute $\mathcal{U}(A)$, a network throughput attribute $\mathcal{U}(T)$, a response time attribute $\mathcal{U}(Rt)$, and a latency attribute $\mathcal{U}(Lt)$.

17. The method of claim 16, wherein calculating further comprises calculating a provider utility $\mathcal{U}_s$ for each of the plurality of potential resource placement solutions, based at least in part on the corresponding calculated values for the plurality of provider-centric attributes for the particular potential resource placement solution:

$$\mathcal{U}_s = (\alpha_1 * \mathcal{U}(P) + \beta_1) * (\alpha_2 * \mathcal{U}(R) + \beta_2) * (\alpha_3 * \mathcal{U}(R) + \beta_3)$$

where $\alpha_1$, $\alpha_2$, and $\alpha_3$ are relative weights of profit attribute $\mathcal{U}(P)$, data locality attribute $\mathcal{U}(D)$, and data replication attribute $\mathcal{U}(R)$, and $\beta_1$, $\beta_2$, and $\beta_3$ are additive weights that store dependence on other attributes.

18. The method of claim 17, wherein calculating further comprises calculating a customer utility $\mathcal{U}_e$ for each of the plurality of potential resource placement solutions, based at least in part on the corresponding calculated values for the one or more provider-centric attributes for the particular potential resource placement solution:

$$\mathcal{U}_e = (\alpha_4 * \mathcal{U}(L) + \beta_4) * (\alpha_5 * \mathcal{U}(A) + \beta_5) * (\alpha_6 * \mathcal{U}(T) + \beta_6) * (\alpha_7 * \mathcal{U}(Rt) + \beta_7) * (\alpha_8 * \mathcal{U}(Lt) + \beta_8)$$

where $\alpha_4$, $\alpha_5$, $\alpha_6$, $\alpha_7$, and $\alpha_8$ are relative weights of locality or anti-locality attribute $\mathcal{U}(L)$, availability attribute $\mathcal{U}(A)$, network throughput attribute $\mathcal{U}(T)$, response time attribute $\mathcal{U}(Rt)$, and latency attribute $\mathcal{U}(Lt)$, and $\beta_4$, $\beta_5$, $\beta_6$, $\beta_7$, and $\beta_8$ are additive weights that store dependence on other attributes.

19. One or more non-transitory computer-readable media (CRM) comprising instructions that cause a computing device, in response to execution of the instructions by a hardware processor, to operate a resource-workload manager of a computing infrastructure to:

receive resource data and workload data for the computing infrastructure;

generate a plurality of potential resource placement solutions for allocation of the resources of the computing infrastructure to various components of the workloads;

calculate one or more values for one or more provider-centric attributes, and one or more values for one or more customer-centric attributes, for the plurality of potential resource placement solutions;

analyze the values of the provider-centric and customer-centric attributes and select one of the potential resource placement solutions, based at least in part on the analyzed values; and allocate the resources of the computing infrastructure, based at least in part on the selected resource placement solution.

20. The non-transitory CRM of claim 19, wherein to calculate comprises to calculate the values for the one or more provider-centric attributes, for the plurality of potential resource placement solutions.

21. The non-transitory CRM of claim 20, wherein the one or more provider-centric attributes comprise one or more of a revenue attribute, an expenditure attribute, a profit attribute $\mathcal{U}(P)$, a data locality attribute $\mathcal{U}(D)$, and a data replication attribute $\mathcal{U}(R)$.

22. The non-transitory CRM of claim 21, wherein to calculate further comprises to calculate a provider utility $\mathcal{U}_s$ for each of the plurality of potential resource placement solutions, based at least in part on the corresponding calculated values for the plurality of provider-centric attributes for the particular potential resource placement solution:

$$\mathcal{U}_s = (\alpha_1 * \mathcal{U}(P) + \beta_1) * (\alpha_2 * \mathcal{U}(D) + \beta_2) * (\alpha_3 * \mathcal{U}(R) + \beta_3)$$

where $\alpha_1$, $\alpha_2$, and $\alpha_3$ are relative weights of profit attribute $\mathcal{U}(P)$, data locality attribute $\mathcal{U}(D)$, and data replication attribute $\mathcal{U}(R)$, and $\beta_1$, $\beta_2$, and $\beta_3$ are additive weights that store dependence on other attributes.

23. The non-transitory CRM of claim 19, wherein one or more utility function calculators include a utility function calculator to calculate values for one or more customer-centric attributes, for the plurality of potential solutions; wherein the one or more customer-centric attributes comprise at least two attributes selected from an attribute group that includes a service components locality or anti-locality attribute $\mathcal{U}(L)$, an availability attribute $\mathcal{U}(A)$, a network throughput attribute $\mathcal{U}(T)$, a response time attribute $\mathcal{U}(Rt)$, and a latency attribute $\mathcal{U}(Lt)$.

24. The non-transitory CRM of claim 23, wherein to calculate further comprises to calculate a customer utility $\mathcal{U}_e$ for each of the plurality of potential resource placement solutions, based at least in part on the corresponding calculated values for the one or more provider-centric attributes for the particular potential resource placement solution:

$$\mathcal{U}_e = (\alpha_4 * \mathcal{U}(L) + \beta_4) * (\alpha_5 * \mathcal{U}(A) + \beta_5) * (\alpha_6 * \mathcal{U}(T) + \beta_6) * (\alpha_7 * \mathcal{U}(Rt) + \beta_7) * (\alpha_8 * \mathcal{U}(Lt) + \beta_8)$$

where $\alpha_4$, $\alpha_5$, $\alpha_6$, $\alpha_7$, and $\alpha_8$ are relative weights of locality or anti-locality attribute $\mathcal{U}(L)$, availability attribute $\mathcal{U}(A)$, network throughput attribute $\mathcal{U}(T)$, response time attribute $\mathcal{U}(Rt)$, and latency attribute $\mathcal{U}(Lt)$, and $\beta_4$, $\beta_5$, $\beta_6$, $\beta_7$, and $\beta_8$ are additive weights that store dependence on other attributes.

* * * * *